(12) United States Patent
Stempinski

(10) Patent No.: US 7,154,052 B2
(45) Date of Patent: Dec. 26, 2006

(54) DEVICE PLATE FOR MOUNTING A COMMUNICATIONS DEVICE TO A RACEWAY

(75) Inventor: Shawn Stempinski, Newington, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 11/073,077

(22) Filed: Mar. 4, 2005

(65) Prior Publication Data
US 2006/0207793 A1    Sep. 21, 2006

(51) Int. Cl.
H02G 3/08 (2006.01)
(52) U.S. Cl. .................. 174/481; 174/480; 174/495; 174/68.3; 439/207; 52/220.7
(58) Field of Classification Search .................. 174/48, 174/49, 68.1, 68.3, 60, 65 R, 72 R, 88 R, 174/95, 96, 99 R, 135, 480, 481, 495; 248/68.1, 248/49, 74.4; 439/207, 209, 211, 216, 212, 439/538; 220/3.3, 3.8; 52/220.1, 220.3, 52/220.5, 220.7
See application file for complete search history.

(56) References Cited

U.S. PATENT DOCUMENTS

| | | | | |
|---|---|---|---|---|
| 5,879,185 A | * | 3/1999 | Handler et al. ............ 439/538 |
| 5,942,724 A | * | 8/1999 | Russo et al. ................ 174/48 |
| 5,998,732 A | * | 12/1999 | Caveney et al. ............. 174/48 |
| 6,355,880 B1 | * | 3/2002 | Bateson et al. .............. 174/48 |
| 6,362,420 B1 | * | 3/2002 | Bacouelle et al. ........... 174/48 |
| 6,384,336 B1 | * | 5/2002 | VanderVelde et al. ....... 174/95 |
| 6,664,467 B1 | * | 12/2003 | de la Borbolla ............. 174/48 |
| 6,936,766 B1 | * | 8/2005 | Galasso ...................... 174/48 |

* cited by examiner

Primary Examiner—Angel R. Estrada
(74) Attorney, Agent, or Firm—McCormick, Paulding & Huber LLP

(57) ABSTRACT

A device plate for mounting a communications device to a raceway defining a wireway, the device plate including a base having first and second opposing sides and defining an opening therethrough for providing access to the wireway when the device plate is attached to the raceway. The device plate being attachable to the raceway such that the first side of the base faces the wireway. The device plate includes a coupler support extending generally perpendicular from the first side of the base adjacent the opening therein such that the coupler support extends into the wireway when the base is attached to the raceway. The coupler support adapted for mounting a coupler thereto. The device plate further including means for attaching the base to the raceway and means for mounting a communications device to the second side of the base.

8 Claims, 5 Drawing Sheets

DEVICE PLATE FOR MOUNTING A COMMUNICATIONS DEVICE TO A RACEWAY

FIELD OF THE INVENTION

The present invention relates to a raceway used to provide cable along a wall structure, and more particularly to a device plate mountable on the raceway for supporting a wireless communications device.

BACKGROUND OF THE INVENTION

Cable raceways are used to support and enclose electrical and communication cables and are typically provided on an existing wall within a structure. The raceway includes a U-shaped raceway body open on one side and mountable to a wall or ceiling structure for enclosing cables to service a work area. Usually the raceway body defines at least one wireway for accommodating power and/or communications cables. Often a longitudinal divider wall is attached to the interior the raceway body such that the raceway body is divided into two wireways which can be used to separate power and communications cables. A bottom wall of the U-shaped raceway body is generally attached to a wall structure along which the raceway extends. Typically a raceway cover panel is attached to the raceway body for enclosing the open front side of the U-shaped raceway body. The wireways may be provided with retainer clips to support the cables.

Electrical outlet devices are typically mounted in a cable raceway body and connected to one or more cables passing through the raceway. Such an electrical or data/communications device is typically supported on a device plate mounted to the raceway body in a gap or space between cover panels. Such device plates usually define one or more openings for wires to pass through for connecting the electrical outlet device to the cables or wires passing through the raceway. Accordingly, prior art device plates for use with a raceway are typically designed for mounting electrical devices to the raceway and providing access to the cables carried thereby.

Although various types of communications cables such as telephone lines, cable television and network access cables are also carried by raceway structures, any larger devices such as wireless access enclosures for example, must be separately mounted to the wall or ceiling structure, and the connecting cables run to that enclosure via a branch raceway. Such communications devices often include one or more female ports for coupling the device to a network cable, a telecommunications cable or another device. Access points used throughout a structure also typically include a female port coupled to a network cable or telecommunications line for coupling a communications device thereto via a jumper cable having male couplers at opposing ends thereof.

Prior art device plates for use in mounting electrical devices to a raceway do not accommodate the couplers that are normally required with communications devices. One object of the present invention is to provide a device plate for mounting communications devices to raceways including raceways of the type that provide separated wireways for power and data/com cables and wiring.

SUMMARY OF THE INVENTION

The present invention provides a device plate for mounting a communications device to a raceway defining a wireway. The device plate includes a base having first and second opposing sides and defining an opening therethrough for providing access to the wireway when the device plate is attached to the raceway. The base being attachable to the raceway such that the first side thereof faces the wireway. The device plate further includes a coupler support extending generally perpendicular from the first side of the base adjacent the opening therethrough such that the coupler support extends into said wireway when said base is attached to the raceway. The coupler support being adapted for mounting a coupler thereto.

The device plate also includes means for attaching the base to the raceway. In a preferred embodiment a plurality of tabs extend outwardly from the second side of the base and are engageable with the raceway body for coupling the base of the device plate to the raceway.

The device plate also includes means for mounting a communications device to the second side of the base such that a communications device is mountable to the raceway via the device plate. Preferably the means for mounting a communications device to the base includes a mounting member attached to the base and extending outwardly from the second side thereof. The mounting member corresponding to a mount on the communications device for removably attaching the communications device to the device plate and thereby to the raceway.

Preferably, the opening in the base is sized to receive a male coupler or connector on the free end of a jump wire that connects the communications device to a cable in the raceway. A mating coupler or connector being mounted to a coupler support attached to the device plate.

In a preferred embodiment of the present invention the device plate has a plurality of tabs formed on the base of the device plate that are engageable with a surface of the raceway for coupling the device plate to the raceway.

In accordance with the present invention, the device plate includes an alignment member attached to the base for aligning a communications device with the base during installation of the communications device.

Other objects, features and advantages of the present invention device plate will become apparent from the following description of the invention considered in conjunction with the accompanying drawings.

DESCRIPTION OF A PREFERRED EMBODIMENT

Figure 1:
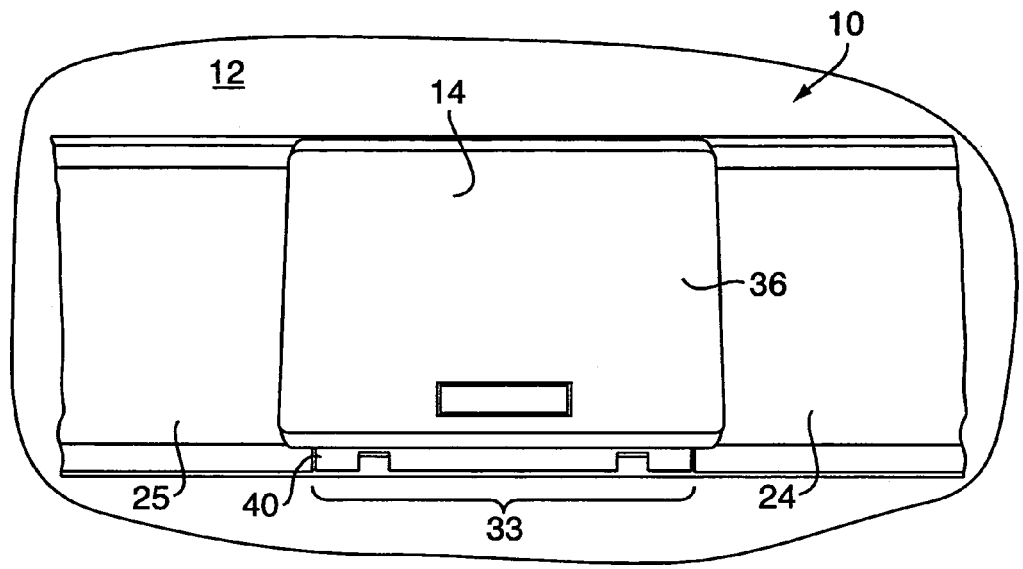
FIG. 1 is a front side view of a section of raceway with a communications device mounted thereto via a device plate in accordance with the present invention.
Figure 2:
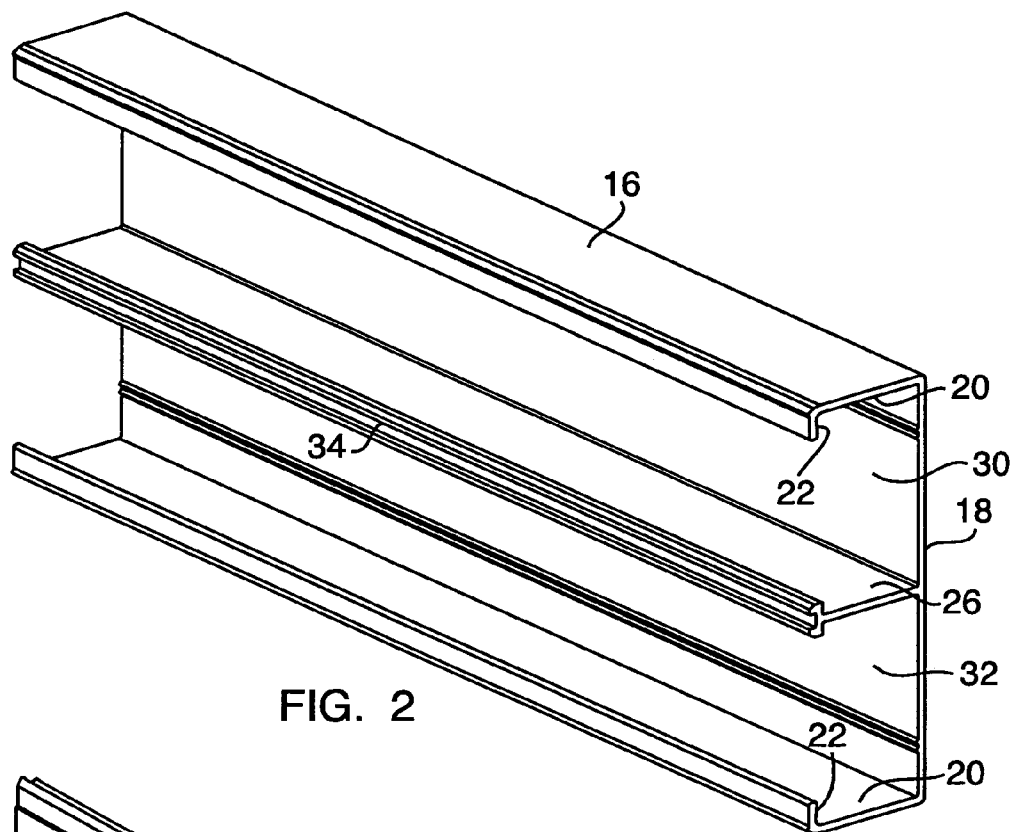
FIG. 2 is a perspective view of a portion of the raceway of FIG. 1.
Figure 3:
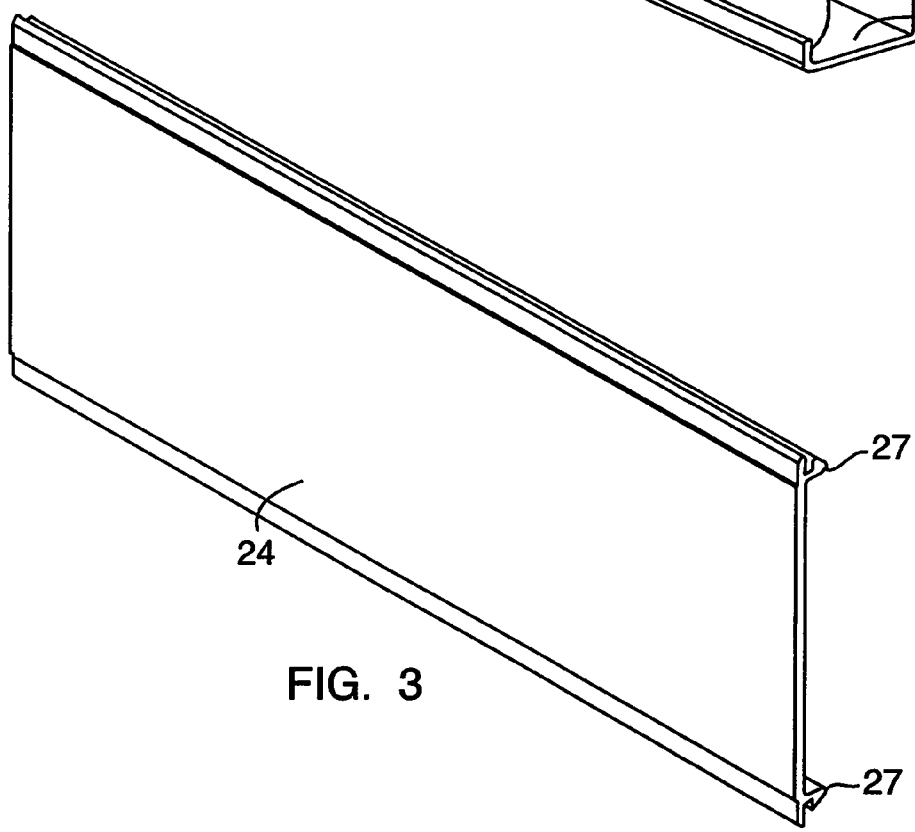
FIG. 3 is a perspective view of a portion of the cover panel of the raceway of FIG. 1.
Figure 4:
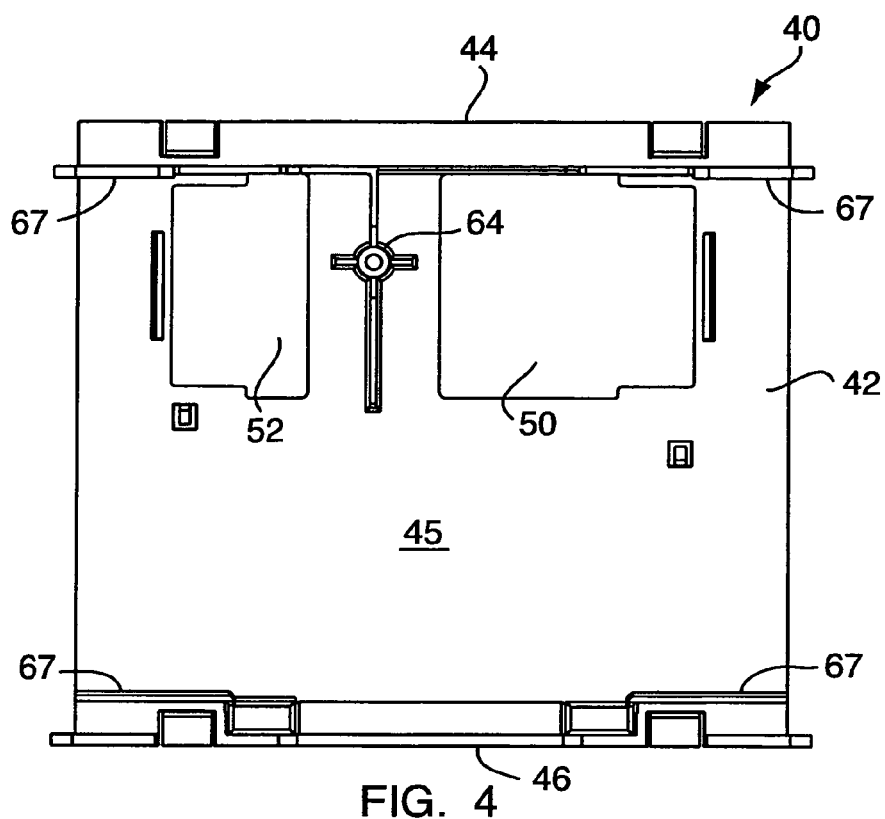
FIG. 4 is a front side view of a device plate according to the present invention.

Referring to FIGS. 1–3, an elongated raceway 10 extends along a wall structure. An Ortronics Wi-Jack™ wireless wall outlet or wireless access point device 14 is shown mounted on the raceway 10. Only a small section of the raceway 10 is shown in the figures, but represents a typical run of Wiremold 5400 style surface raceway. Wiremold and Ortronics are wholly owned subsidiaries of Legrand SNC of Limoges, France.

The raceway 10 includes a generally U-shaped raceway body 16 having a back wall 18 normally mounted to a wall or ceiling structure as shown in FIG. 1. The raceway body 16 includes a pair of opposing side walls 20, 20 extending outwardly from the back wall 18 and generally perpendicular thereto. The side walls 20, 20 extend along the elongated raceway body 16 and each sidewall defines a longitudinal flange 22 at a free edge thereof for coupling a raceway cover panel 24 to the raceway body 16. A divider wall 26 disposed between the side walls 20, 20 also extends generally perpendicular to the back wall 18 along the length of the raceway body 16 and cooperates with the back wall 18 and side walls 20, 20 to define first and second wireways 30 and 32, respectively for enclosing cables not shown.

As shown in FIG. 3, the raceway cover panel 24 defines marginal edge portions 27,27 formed at opposing edges thereof that are adapted to engage the corresponding flanges 22 of the base or body to secure the raceway cover panel 24 to the raceway body 16. An inner side of the cover panel 24 meets an upper edge 34 of a divider wall 26 such that separate compartments or wireways 30 and 32 are provided for enclosing cables therein. Typically the first wireway 30 is used for communications cables and the second wireway 32 is used for electrical wiring, or vice versa, such that electrical and communications cables are housed in separate wireways.

Figure 8:
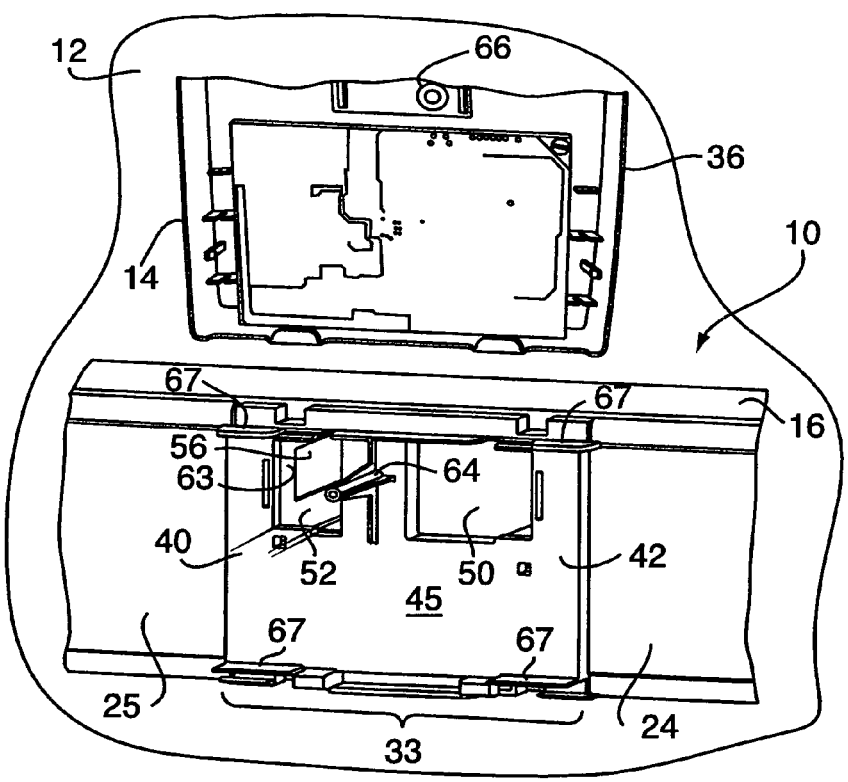
FIG. 8 is a perspective view of the raceway of FIG. 1 including a device plate of the present invention mounted thereto and a communications device shown adjacent the raceway.

Referring to FIGS. 1 and 8, a second raceway cover panel 25, identical to the cover panel 24, is shown mounted to the raceway body 16 but is spaced apart from the cover panel 24 and defines an opening or gap 33 therebetween. The opposing ends of the two spaced apart raceway cover panels 24 and 25 need be rough cut only as they are hidden from view by a front cover 36 of the wireless access point device 14. The length of the gap 33 between the cover panels 24 and 25 is approximately the length of a device plate 40 of the present invention to be described.

As shown in FIGS. 4–9, the device plate 40 includes a rectangular base 42 having opposing edge portions 44 and 46 and defining inner and outer surfaces 43 and 45 respectively. The edge portions 44 and 46 overlap the flange 22 of each of the side walls 20, 20 of the raceway body 16 when the device plate 40 is mounted thereto. When the device plate 40 is mounted to the raceway body 16 the inner surface 43 of the base 42 faces the wireways 30 and 32 and forms a partial cover therefor at the opening 33.

Figure 5:
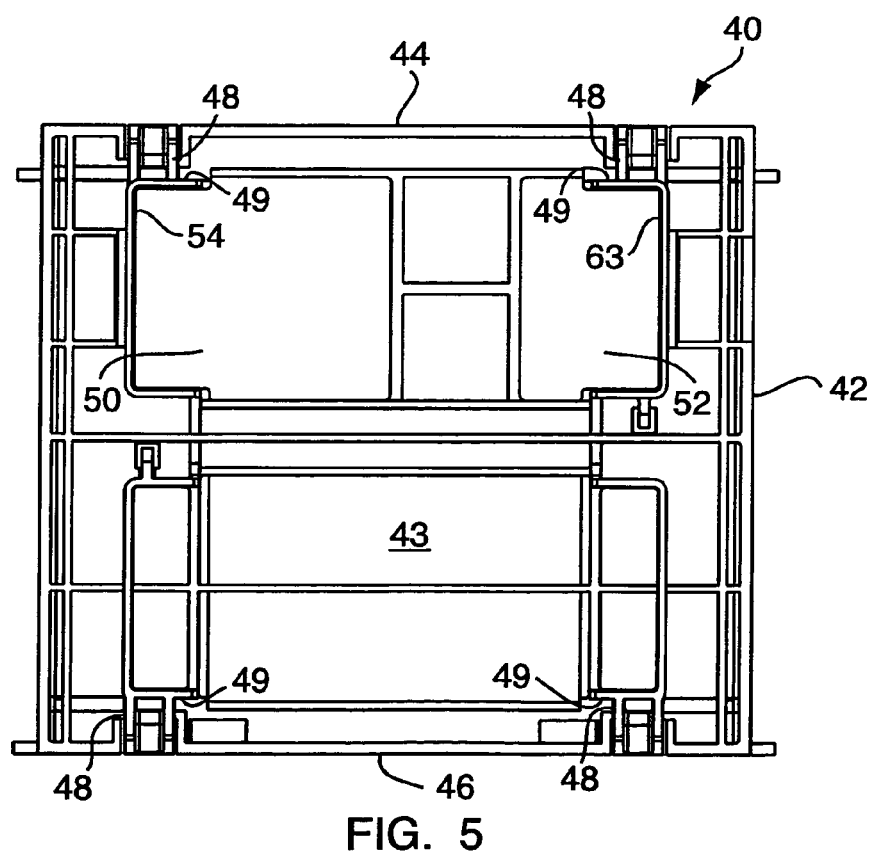
FIG. 5 is a rear side view of the device plate of FIG. 4.
Figure 6:
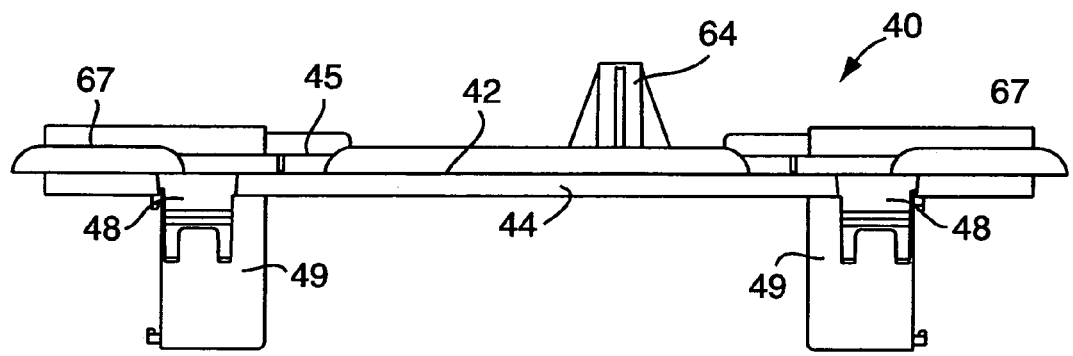
FIG. 6 is a top side view of the device plate of FIG. 4.
Figure 7:
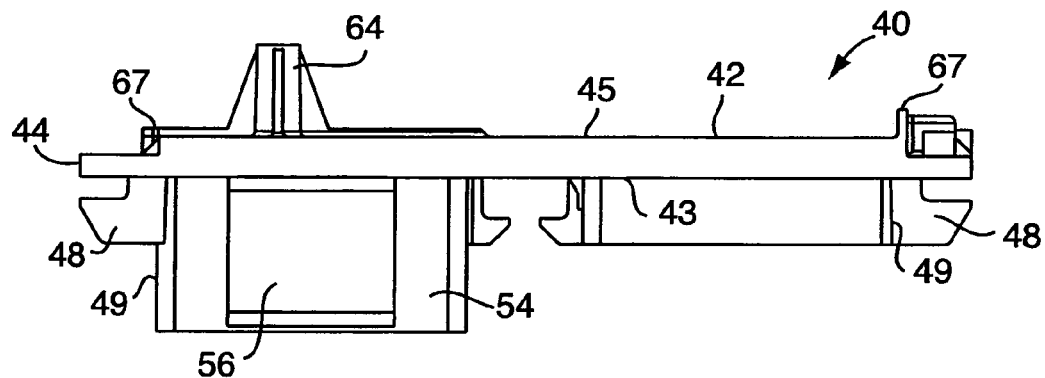
FIG. 7 is an end view of the device plate of FIG. 4.

A plurality of tabs 48 are molded into the device plate 40 and are spaced apart from the inner surface 43, and aligned with one of the edge portions 44 and 46 of the base 42 of the device plate. The tabs 48 are adapted to engage the flanges 22 of the side walls 20 in a snap-fit, or slideable in the raceway for coupling the device plate 40 to the raceway body 16. As shown in FIGS. 5 and 6, each of the tabs 48 are mounted to tab supports 49 which extend outwardly from the inner surface 43 of the base 42.

As shown in FIGS. 5–8, the base 42 defines first and second openings therethrough identified by the reference numbers 50 and 52 respectively. The first and second openings 50 and 52 provide access to the first wireway 30 from outside of the raceway 10. A first coupler support 54 extends outwardly from the inner surface 43 of the base 42 adjacent the first opening 50 such that the coupler support extends into the first wireway 30 when the device plate 40 is mounted to the raceway 10. The coupler support 54 defines an opening 56 for receiving a connector or coupler 60 that is attached to one or more communication cables (not shown) housed in the first wireway 30. The opening 56 is so arranged that the coupler 60 when engaged with the opening 56 is aligned substantially parallel to the longitudinally oriented raceway 10, and the cables disposed therein. Thus, cables connected to the coupler 60 are oriented parallel therewith so that the cables are connectable to the coupler without twisting or kinking the cables near the connection point with coupler 60. As shown in the drawings, the first coupler support 54 extends generally perpendicular to and is attached at one end to one of the tab supports 49. Thus, one of the tab supports 49 and the first coupler support 54 cooperate to support one another. The opposite end of the first coupler support 54 includes a support portion attached generally perpendicular to the opening 56. Although, the first coupler support 54 defines an opening 56 for receiving a coupler, the present invention is not limited in this regard as the coupler support 54 may include other structures for supporting a coupler such as a clip or a pair of prongs coupled to and extending from the base 42.

Additionally, in other embodiments within the scope of the present invention, the base 42 may define additional openings therethrough such that the second wireway 32 and the wires or cables therein are accessible in the event electrical power is needed for the communications device or other device mounted on base 42.

Figure 9:
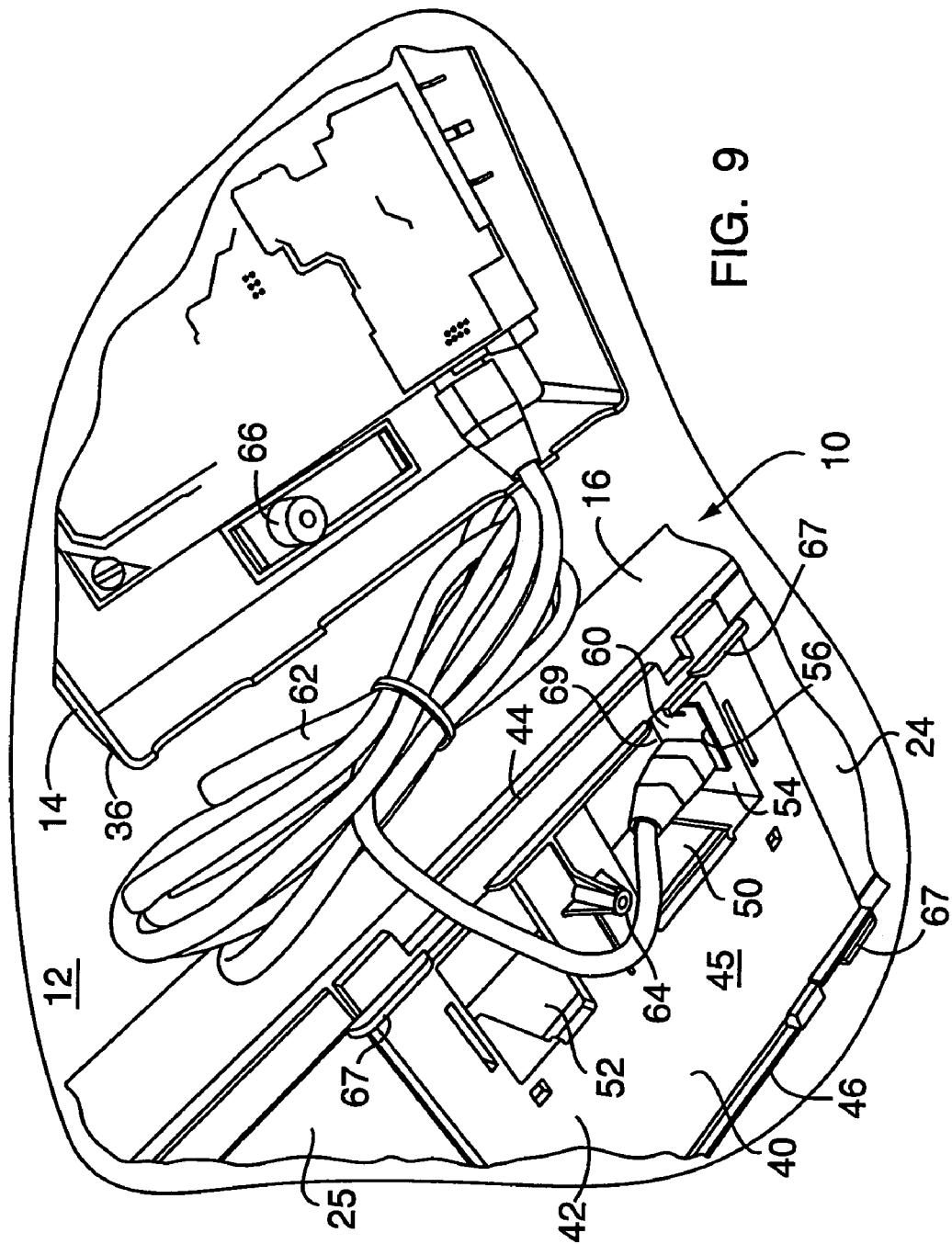
FIG. 9 is a perspective view of a combination of the raceway and device plate of FIG. 8 shown with a communications device coupled via a jumper cable to a cable (not shown) contained in the raceway.

Referring to FIG. 9, the coupler 60 is a Register Jack 45 (RJ-45) socket for receiving an RJ-45 plug (not shown) that is coupled to a jumper cable 62. The jumper cable 62 connects the wireless access point device 14 through the coupler 60 to communications cables disposed in the first wireway 30.

As shown in FIG. 9, the first coupler support 54 extends through only a portion of the depth of the wireway 30, such that a gap 69 is defined between a free end of the first coupler support and the rear wall 18 of the raceway body 16. Therefore, through cables and/or any wires disposed in the wireway 30 not connected to the coupler 60 are able to pass through the gap 69 and are undisturbed by the device plate 40.

Referring again to FIG. 5, a second coupler support 63 also extends inwardly from the inner surface 43 of the device plate 40 adjacent the second opening 52. Similar to the first coupler support 54, the second coupler support 63 extends into the first wireway 30 and defines an opening 56 for receiving a second coupler (not shown). The second coupler support 63 also extends only a portion of the way across the wireway 30 such that through cables can pass through the wireway 30 behind the device plate 40 and are unaffected thereby.

The jumper cable 62 shown in FIG. 9 is the only cable coupled to the wireless access point device 14, thus, the second coupler support 63 is not utilized in the FIG. 9 embodiment. However, one skilled in the art will recognize that the present invention is not limited in this regard, as a device plate according to the present invention may include multiple coupler supports and corresponding jumper cables depending on the requirements of the communications device being mounted to the raceway 10. Although, the jumper cable 62 of FIG. 9 is shown as a long cable coiled into a bundle and secured with a cable tie, typically, a short jumper cable can be utilized such that the jumper cable can easily be stored within the wireless access communications device and the device plate to which it is mounted.

As shown in FIGS. 8 and 9, a boss or mount member 64 is formed with the base 42 and extends outwardly from the outer surface 45 thereof. The mount member 64 corresponds to a second mount member 66 attached to the wireless access point device 14 for mounting the device to the device plate 40 via a fastener (not shown). The mount members 64 and 66 cooperate to ensure that the internal components of the wireless access point device 14 remain spaced from the base 42 when the wireless access point device is mounted thereto. Alternatively, other types of fasteners or attachment means can be provided in accordance with the present invention for coupling a communications device to the device plate. For example the base of the device plate could define a plurality of openings arranged to engage corresponding tabs extending from the communications device. One skilled in the art will recognize that still further known methods can be utilized to mount a communications device to the device plate of the present invention without departing from within the scope thereof.

Additionally, a plurality of alignment tabs 67 are provided on the device plate 40 at the edge portions of the base 42 and provide further support to the wireless access point device 14 when the device is mounted to the device plate. The alignment tabs 67 also facilitate aligning the wireless access point device 14 with the base 42 during installation of the wireless access point device.

Although the present invention has been described in relation to a particular embodiment thereof, many other variations and modifications and other uses will become apparent to those skilled in the art. It is preferred, therefore, that the present invention be limited not by the specific disclosure herein, but by the claims appended hereto.

What is claimed is:

1. In combination with a raceway of the type having divided wireways, and a U-shaped base having parallel top and bottom flanges with inturned marginal edges to receive raceway covers, the improvement comprising a device bracket fitted between the raceway covers and snapped into the raceway base between the inturned marginal edges, said device bracket having resilient tabs for engaging said raceway base marginal edges, and said device bracket further including a wall portion for enclosing one of the wireways, and a coupler support arranged to extend into one of the wireways, the coupler support defining an opening for receiving a coupler connected to data/telecommunication cables in the wireway, and a cover adapted to be mounted to said device bracket, said cover housing at least one circuit board including circuitry suitable for providing wireless connections to and from a transmitter/receiver circuitry provided on said at least one circuit board, and a patch cord being provided between said circuit board and said coupler, said patch cord being provided between said housing and said device bracket whereby a wireless access point is provided in the raceway for use by those in the environment of said access point for use of one or more personal computers at least to the extend provided for under the management and control of the entity responsible for providing said cable in said raceway/wireway.

2. In a raceway of the type having adjacent wireways with a divider wall between these adjacent wireways, the improvement comprising a device bracket mounted to the raceway base and having resilient tabs for engaging the raceway base, said device bracket further including a wall portion for enclosing one of the wireways, and having an adjacent portion defining at least one coupler support, said coupler support defining an opening for receiving a coupler connected to data/telecommunication cables in the other wireway of the raceway base, and a cover mounted to said device bracket, said cover housing at least one circuit board including wireless connections circuitry, and a patch cord provided between said circuit board and said coupler, said patch cord being provided behind said cover whereby a wireless access point is provided in the raceway for use by those in the environment of said wireless access point.

3. The raceway according to claim 2 wherein the device bracket includes at least one alignment tab extending from a periphery thereof for positioning the cover relative to the device bracket.

4. The raceway according to claim 2 including a U-shaped base having parallel flanges on opposing sidewalls thereof, the resilient tabs on the device bracket engageable with the flanges for securing the device bracket to the base.

5. The raceway according to claim 2 wherein the wireless connection circuitry includes a transmitter/receiver.

6. The raceway according to claim 2 wherein the coupler support is arranged to extend into one of the wireways of the raceway when the device bracket is mounted to the raceway.

7. The raceway of claim 6 wherein the device bracket includes means for securing a coupler to the coupler support.

8. The raceway of claim 2 wherein the device bracket includes a mount for attaching said cover to the device bracket.

* * * * *